Jan. 19, 1954 L. GENDLER ET AL 2,666,398
AUTOMATIC MACHINE FOR FORMING BAGLE-DOUGH RINGS
Filed Sept. 30, 1948 5 Sheets-Sheet 4
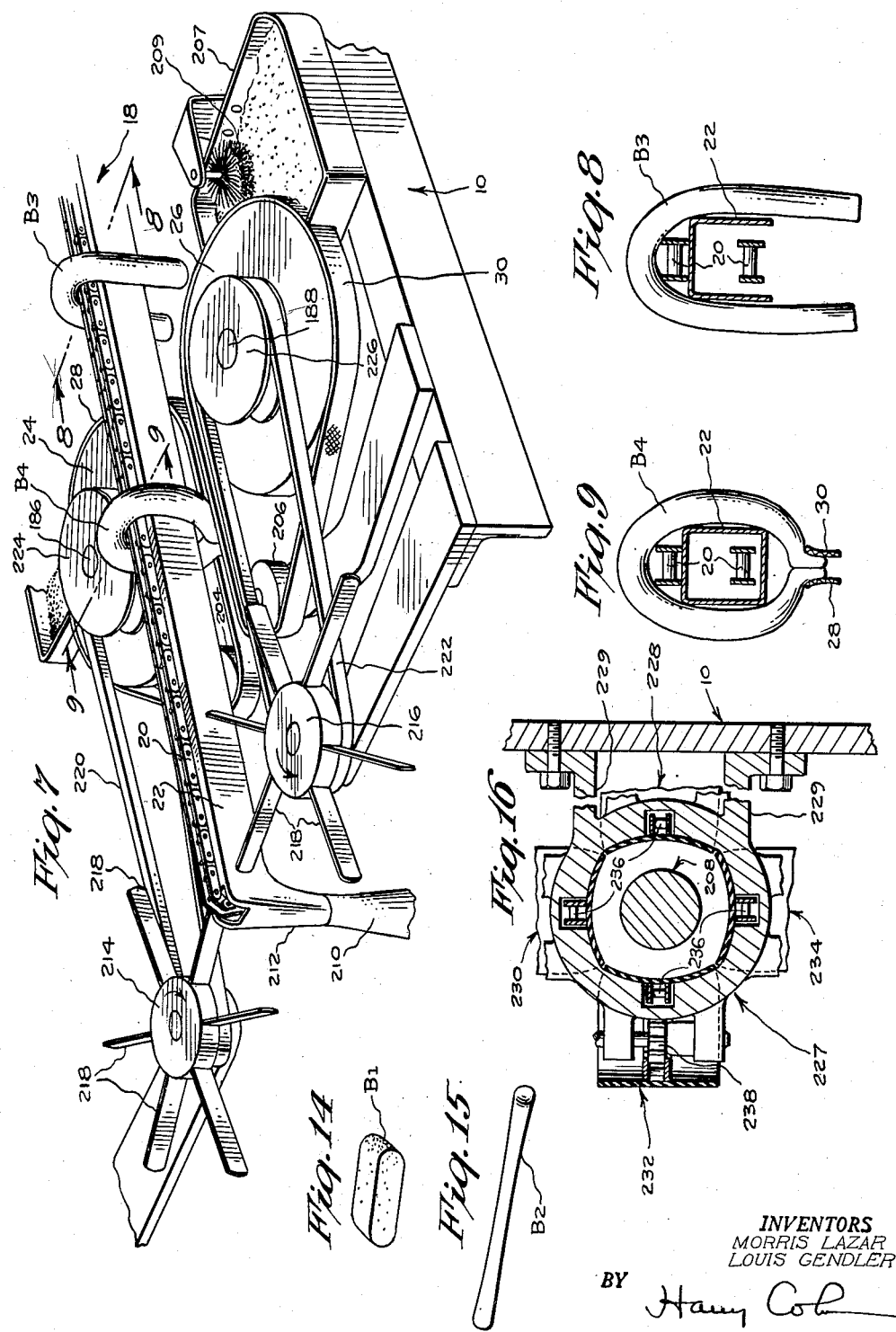
INVENTORS
MORRIS LAZAR
LOUIS GENDLER
BY
Harry Cole
ATTORNEY

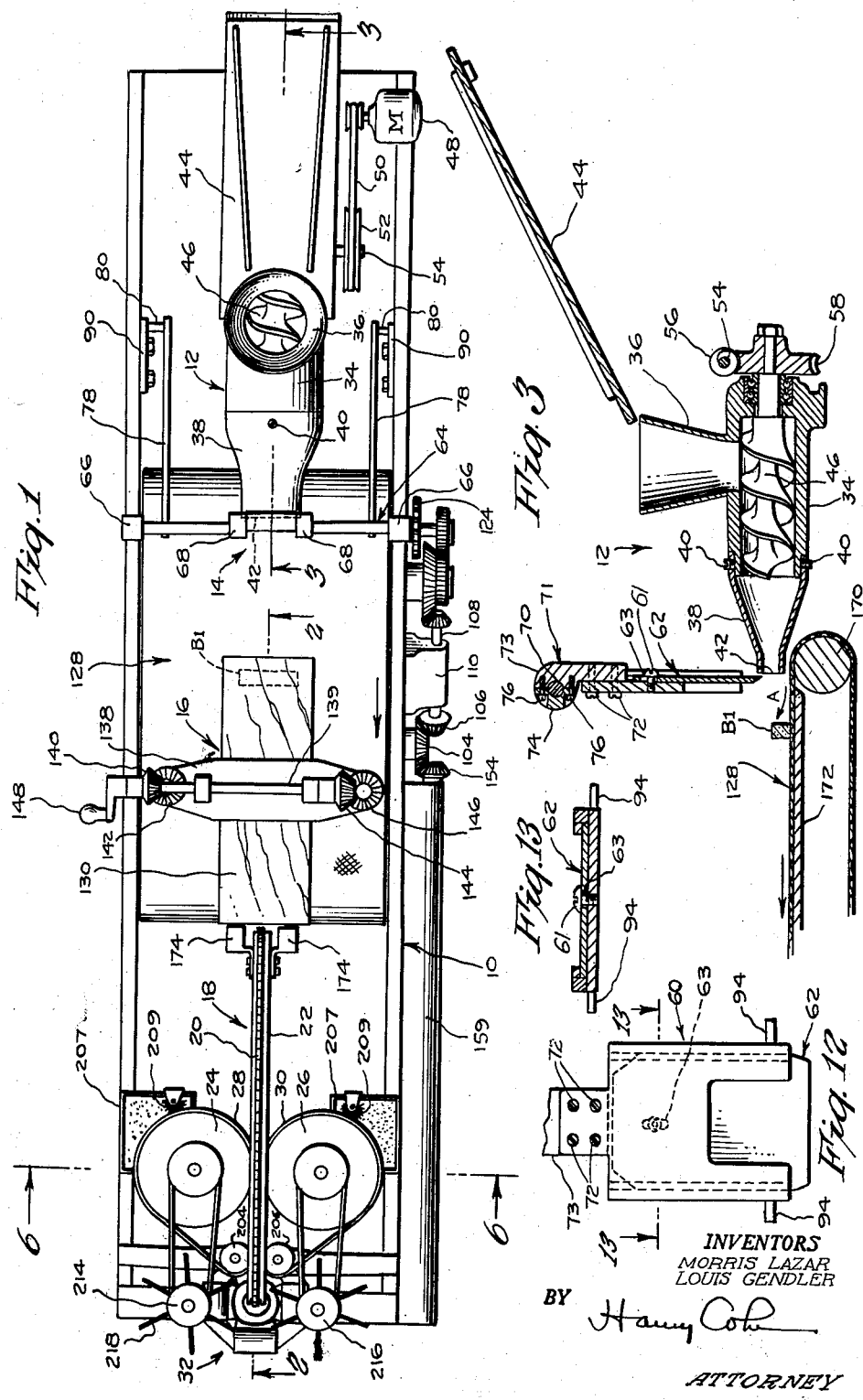

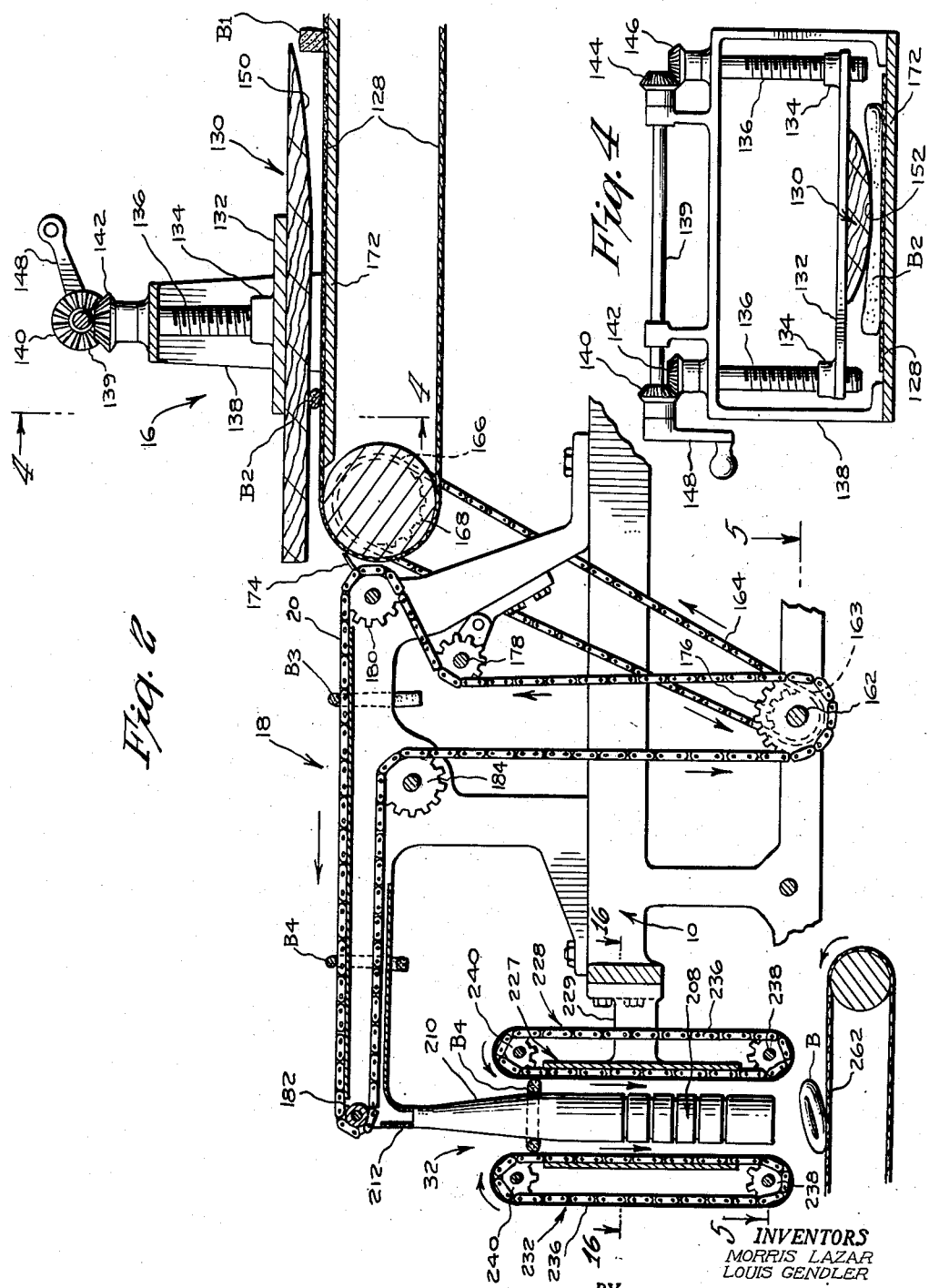

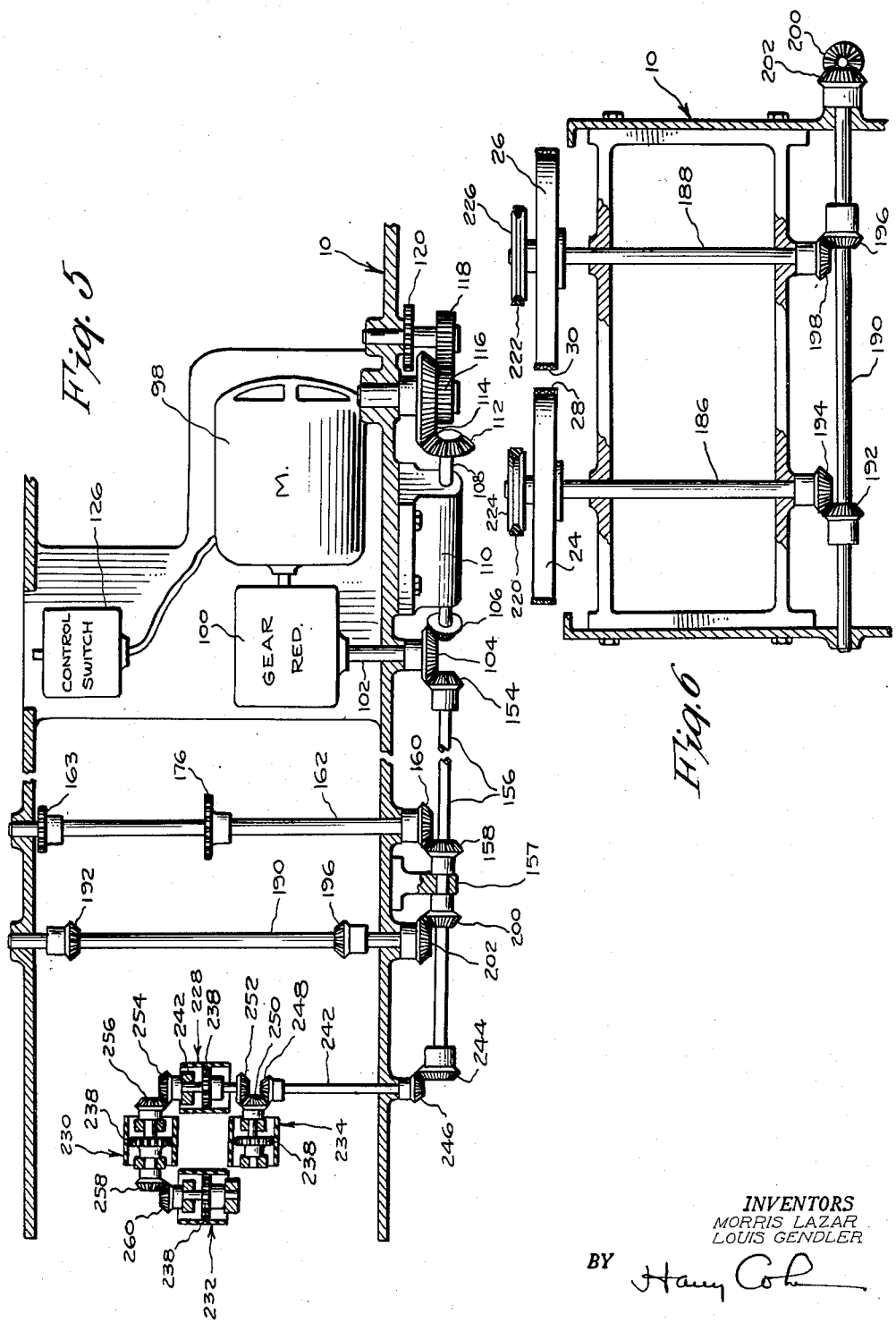

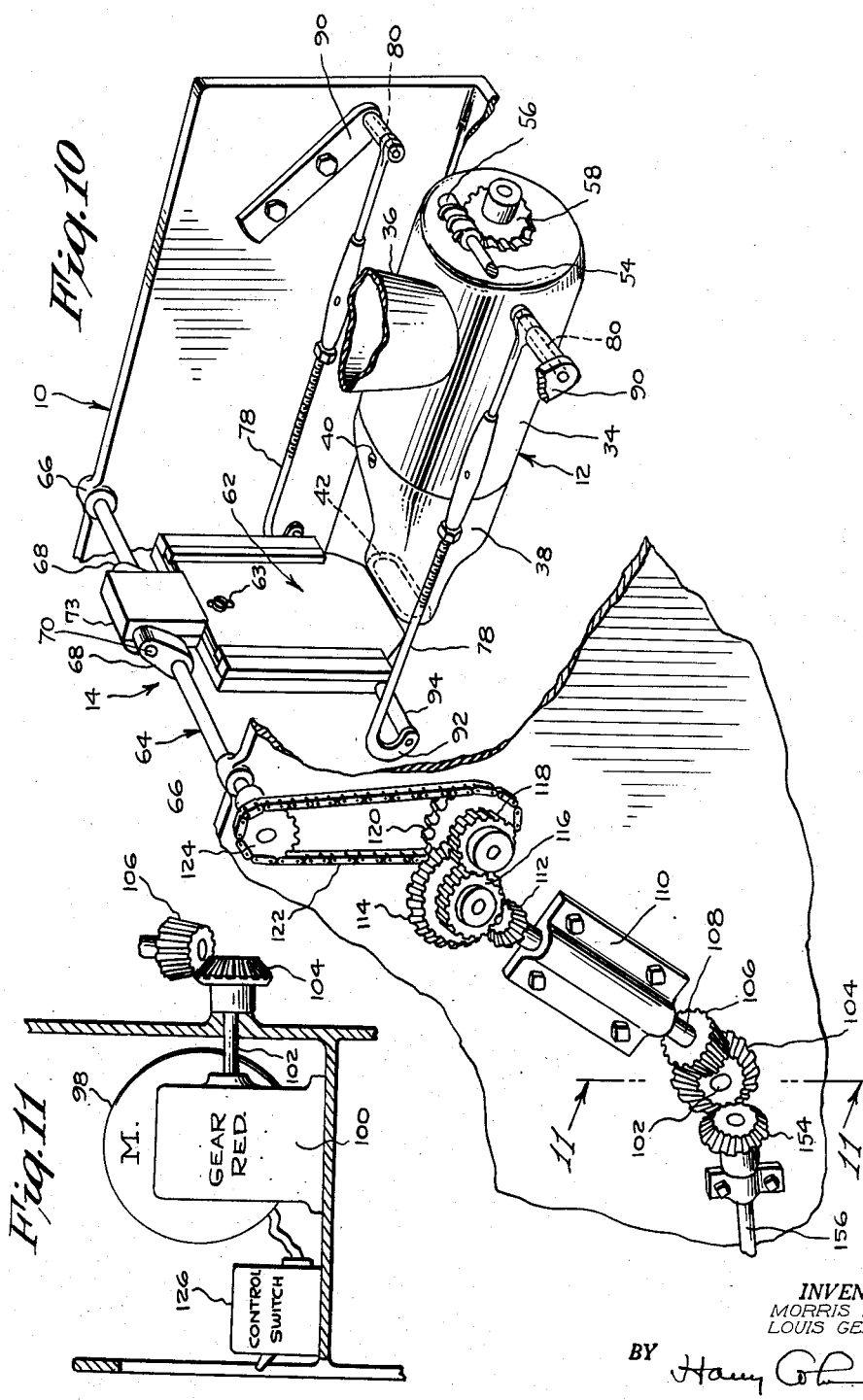

Patented Jan. 19, 1954

2,666,398

UNITED STATES PATENT OFFICE 2,666,398

AUTOMATIC MACHINE FOR FORMING BAGLE-DOUGH RINGS

Louis Gendler, New York, and Morris Lazar, Jamaica, N. Y., assignors to American Bagel Machine Co., Inc., New York, N. Y., a corporation of New York Application September 30, 1948, Serial No. 51,886

28 Claims. (Cl. 107—4)

Our invention relates to an automatic machine for forming dough rings for making bagles.

The primary object and purpose of this invention is to provide a machine which is operable automatically to produce rings of bagle shape from a mass of bagle dough. Heretofore, so far as we are aware it has been necessary for bakers to produce such rings by manual operations, and although attempts have been made prior to the present invention to provide a machine for making such rings, such attempts, so far as we are aware, have been unsuccessful.

The above and other objects of the invention as well as objects ancillary thereto will be fully understood from the following description considered in connection with the accompanying drawings which, however, are to be considered as illustrative of our invention but not in limitation thereof.

In the drawings:

Fig. 1 is a top plan view of a machine embodying our invention;

Fig. 2 is a sectional view, on a larger scale, on the line 2—2 of Fig. 1, parts of the machine being omitted for clearness of illustration of the parts shown;

Fig. 3 is a sectional view on the line 3—3 of Fig. 1;

Fig. 4 is a sectional view on the line 4—4 of Fig. 2;

Fig. 5 is a horizontal plan-sectional view on the line 5—5 of Fig. 2;

Fig. 6 is a vertical cross sectional view on the line 6—6 of Fig. 1, parts being omitted for the purpose of illustration;

Fig. 7 is a perspective view of certain parts of the machine;

Fig. 8 is a sectional view on the line 8—8 of Fig. 7;

Fig. 9 is a sectional view on the line 9—9 of Fig. 7;

Fig. 10 is a perspective view of parts of the machine;

Fig. 11 is a sectional view on the line 11—11 of Fig. 10;

Fig. 12 is a view, in elevation, of the cutter;

Fig. 13 is a sectional view on the line 13—13 of Fig. 12;

Fig. 14 is a perspective view of a dough-piece in its initial shape;

Fig. 15 is a perspective view showing the shape of the dough-piece after an operation of parts of the machine on the dough-piece shown by Fig. 14;

Fig. 16 is a sectional view on the line 16—16 of Fig. 2.

As is well known, a bagle is similar in shape to a doughnut, being in the form of a ring having a circular cross section. However, due primarily to the fact that bagle dough prepared according to the usual recipe is comparatively stiff, the bagle ring cannot be formed directly from the dough, as in the case of a doughnut or other pastries, but requires several operations for the formation thereof. More particularly, in order to form a bagle ring from bagle dough it is necessary first to separate a piece of dough of predetermined size from the batch of dough and to shape said piece of dough into a generally cylindrical form, and then to shape the cylindrical piece of dough into the bagle ring. These operations are performed automatically by the machine of the present invention.

Referring now to the drawings in details, the machine embodying the present invention comprises a rigid frame 10 supporting a dough extrusion device 12 and a companion cutting device 14, which operate together to produce a piece of dough in a preliminary shape and of the predetermined size required for forming the bagle; a shaping device 16 which forms said piece of dough into cylindrical shape; a device 18 which includes a former frame 22 and an endless conveyor 20 to receive the cylindrical piece of dough in such manner that it automatically, by gravity, assumes the form of an inverted U (Fig. 8) and conveys said piece of dough to a device which includes the companion rollers 24, 26 and the endless belts 28, 30 which engage the free ends of the piece of dough and press them together (Fig. 9); and a rounding device 32 which receives the endless piece of dough and rounds the same into circular form. The frame 10 also supports other parts of the machine which will be subsequently referred to in the more detailed description of the machine, including the power-driven mechanisms of the machine.

The extrusion device 12 comprises a casing 34 having a hopper inlet 36 and a dough-shaping outlet-cap 38 which is preferably, as here shown, removably secured to casing 34 in any suitable way as by a plurality of screws 40. The outlet opening 42 of cap 38 is of generally oval shape as shown by Figs. 3 and 10. An inclined board 44 is provided for convenience in delivering the dough to the casing of the extrusion device 12. A rotary extrusion screw 46 is disposed within casing 34 for expressing the dough, in the preliminary shape, through the outlet opening 42.

Said rotary screw 46 may be operated in any suitable way, the means provided for this purpose comprising, as here shown, an electric motor 48 which is connected by a belt 50 to a driving pulley 52 on a drive shaft 54. A worm gear 56 operated by shaft 54 meshes with a worm wheel 58 which is secured to the shaft of screw 46 for turning the latter. The screw 46 is driven by motor 48 at a predetermined speed in relation to the speed of cutter 14 whereby to obtain dough pieces of the desired thickness, measured in the direction of the dough feed through opening 42. It will be understood that it is within the scope of this invention to drive screw 46 from the same source of power which operates the other movable parts of this machine and that in such case motor 48 may be omitted.

The cutting device 14 operates in conjunction with the extrusion device 12 to form pieces of dough of the required size and initial shape, one of said pieces being indicated at B1. More particularly, as the dough issues from outlet 42 it is subjected to the action of the cutter for severing the piece of dough from the mass at said outlet opening 42. Referring more particularly to Figs. 1, 3 and 10, cutting device 14 comprises a holder 60 in which the dough cutter or cutting blade 62 is removably secured for sharpening or replacement. Blade 62 is adjustably secured in holder 60 by a screw 61 which passes through an elongated slot 63 in said blade. Holder 60 is actuated by a crank shaft 64 which is journalled for rotation in bearings 66 provided on frame 10, the intermediate portion of said crank shaft is provided with the spaced crank arms 68 and the crank pin 70. Said crank pin engages a member 71 to which blade holder 60 is secured in any suitable way as by screws 72. Member 71 is formed in two parts 73 and 74 removably fastened together around crank pin 70 by screws 76. The lower end of holder 60 is connected to adjustable links 78 which are pivotally mounted at their rear ends on stationary pivot pins 80 carried by stationary brackets 90 rigidly fastened to the adjacent sides, respectively, of frame 10. Links 78 hold the lower end portion of blade 62 against the outer end of cap 38 at opening 42 during the downstroke of blade 62 in the dough cutting operation of said blade, said outer end of cap 38 forming a shear plate or surface in cooperation with the cutting edge portion of blade 62. After the downstroke of cutter 62, the latter is moved upwardly by the action of crank shaft 64 on holder 60, and the parts are arranged so that at the end of the downstroke of cutter 62, the lower end of said cutter moves in an arcuate path a short distance away from the outlet opening 42 of the extrusion device 12, as indicated by the arrow A in Fig. 3 so as to clear and thus not interfere with the extrusion of the dough through said opening. It will be understood that during the operation of holder 60 by crank shaft 64 links 78 swing on their pivots 80 while the outer ends of said links follow the path of movement of said holder. It will be noted that the outer ends 92 of said links are pivotally connected to the pins 94 which are carried by holder 60.

Crank shaft 64 for operating the cutter 62 is power-driven in any suitable way as by an electric motor 98 (Fig. 5) having reduction gearing 100. The power shaft 102 of reduction gearing 100 is operatively connected by a bevel gear 104 and a companion bevel gear 106 to a shaft 108 journalled for rotation in a bearing 110 on frame 10. Said shaft 108 is operatively connected by bevel gears 112, 114 and by companion gears 116 and 118 to a gear 120 which drives a sprocket chain 122 which in turn drives the gear 124 secured to crank shaft 64 for rotating the latter. It will be understood that the gearing is designed to operate the cutter 62 at the desired speed in timed relation to other parts of the machine as will be subsequently described in sufficient detail. As shown, a suitable control switch 126 is provided for motor 98.

Immediately after the piece of dough is cut from the mass as a result of the above-described operation of cutting device 14 in conjunction with extrusion device 12, said piece of dough is deposited on an endless conveyor belt 128 for delivery to the shaping device 16 of which said conveyor belt forms a part as will presently appear. Said shaping device also includes a stationary plate-like member 130 (Figs. 1, 2 and 4) which is adjustable toward and away from the upper surface of belt 128, said member 130 being carried by an adjustable support 132. The latter is provided with a pair of internally screw threaded members or nuts 134 which are in screw threaded engagement with companion rotary screws 136, respectively, mounted in a frame 138 mounted on frame 10. Screws 136 are held against longitudinal movement but are rotatable by a manually operated shaft 139 which is connected to said screws by the companion gears 140, 142 and 144, 146. A crank 148 is provided on rotary shaft 139 for turning said shaft when it is desired to adjust the distance between the companion dough-shaping members 128 and 130. It will be observed that as shown in Fig. 2 the lower surface of member 130 tapers rearwardly as indicated at 150 (Fig. 2), for the admission of the dough-piece B1 between member 130 and belt 128. As belt 128 continues to move, said dough-piece B1 is moved between said belt and member 130 and is rolled and shaped therebetween into the cylindrical form indicated at B2 in Fig. 15. It will be understood that during the rolling operation to which the dough-piece is subjected in passing through the shaping device 16, said dough-piece is elongated and reduced in thickness, as illustrated in Fig. 4. The lower surface of member 130 is convexly curved transversely thereof as indicated at 152 (Fig. 4) so that the dough-piece in its cylindrical elongated form is somewhat thinner at its central portion than at the portions adjacent thereto. This is desirable because the dough-piece is more readily bendable into the U-shaped form thereof hereinafter referred to with reference to Figs. 7 and 8. It will be observed that member 130 and belt 128 operate to roll the dough-piece into a length which is greater than the width of member 130.

As clearly shown in Fig. 3, the outlet opening 42 of the extrusion device 12 is close to the upper surface of belt 128, as a result of which the dough-piece B1, severed from the dough mass as the result of the operation of the cutting device 14, is deposited on belt 128 in a position in which the length of the dough-piece is at right angles to the direction of travel of said belt. This is highly desirable in order to assure the correct position of the dough piece for the proper action thereon of belt 128 and member 130 of the shaping device 16 for forming the cylindrically shaped dough-piece B2. If the outlet end 42 of the extrusion device 12 were spaced a substantial distance above belt 128, dough-piece B1 might, as a result of dropping through such a substantial distance onto the belt, be in a position in which it is inclined lengthwise, or otherwise improperly positioned, in relation to the direction of movement of belt 128. This difficulty is obviated by locating the outlet opening 42 close to the upper surface of said belt and the dough-piece B1 necessarily is deposited in the correct position as hereinbefore described.

Conveyor belt 128 is power driven by motor 98 through reduction gearing 100 in timed relation to the operation of cutting device 14. For this purpose the gear 104 on drive shaft 102 is connected by gear 154 to a rotary shaft 156 journalled for rotation in suitable bearings 157. A housing 159 (Fig. 1) is provided for said shaft and gears carried thereby. Shaft 156 is connected by gears 158 and 160 to a shaft 162 (Figs. 2 and 5). Said shaft is connected by a sprocket chain 164 to a sprocket gear 166 for driving the front roll 168 by which endless belt 128 is driven. The roll 170 for the opposite end of belt 128 need not be driven. It will be understood that rolls 168 and 170 are rotatably mounted in suitable bearings in frame 10. It will be noted that the upper run of belt 128 passes over a rigid plate 172 so that said upper run of the belt is held firmly aganist downward displacement particularly during the action thereof in conjunction with member 130 for rolling and shaping the dough-piece B1 into the cylindrically shaped and elongated piece B2.

The shaped dough-piece B2 is moved by belt 128 to the adjacent end of the device 18 where said dough-piece drops onto conveyor belt 20 of said device and assumes the invented U-shape shown at B3 in Figs. 7 and 8. When the dough-piece B3 moves between the endless belts 28 and 30 the ends of said dough-piece are pressed together forming the somewhat elliptically shaped dough-piece B4 as shown in Figs. 7 and 9. Downwardly inclined members 174, which are secured to frame 22 in any suitable manner, are positioned adjacent the forward end of the upper run of belt 128 for guiding the dough-piece B2 onto the upper run of endless conveyor 20. Conveyor 20 is here shown as a sprocket chain and is driven by a sprocket gear 176 fixed to shaft 162. Said sprocket chain passes over the idler gears 178, 180, over the front guide roll 182 and over the idler sprocket gear 184. Pulleys 24 and 26 which drive endless belts 28 and 30 are driven by vertical shafts 186 and 188 respectively (Fig. 6) which are in turn driven by a shaft 190 operatively connected to shafts 186 and 188 by gears 192, 194 and 196, 198, respectively. Shaft 190 is driven by shaft 156 through gears 200 and 202. It will be understood that through this gearing and pulleys 24 and 26, belts 28 and 30 are driven at the same linear speed as conveyor 20. As illustrated in Figs. 1 and 7 idler pulleys 204 and 206 are provided in conjunction with pulleys 24 and 26 for endless belts 28 and 30, respectively. Provision is made for applying flour or other substance to prevent the dough from sticking to belts 28 and 30. For this purpose flour containers 207 and companion rotary brushes 209 are provided as shown (Figs. 1 and 7) for brushing belts 28 and 30 and applying flour thereto continuously during the movement of said belts. Said brushes are engaged by said belts, respectively, and are thereby rotated.

The rounding device 32 is positioned at the delivery end of conveyor 20 (Figs. 1, 2 and 7). Said rounding device includes a rod 208, the upper end of which tapers upwardly as indicated at 210, the remainder of said rod being cylindrical. Said rod 208 is carried by and depends vertically from the forward end portion 212 of longitudinally extending frame 22 in which the upper run of conveyor 20 extends. When the dough-piece B4 reaches said end 210 of frame 22, the dough-piece moves downwardly around rod 208 into the rounding device 32. In order to obviate the possibility of any of the dough-pieces B4 failing to drop down around rod 208, provision is made for positively moving said dough-pieces off the forward end of conveyor 20. The means which is provided, as here shown, for this purpose comprises the disks 214 and 216 carrying circumferentially spaced blades 218 which are positioned to strike the dough-piece B4 lightly when the latter is at the forward end of frame 22 whereby to push said dough-piece off said end of the frame so that it may drop into rounding device 32 around rod 208. It will be noted that disks 214 and 216 are driven by the belts 220 and 222, respectively, actuated by pulleys 224 and 226 which are driven by shafts 186 and 188.

The rounding device 32 includes a tube 227 supported on frame 10 by brackets 229. A plurality of endless belts, there being four of such belts 228, 230, 232 and 234, extend vertically and are arranged in generally circular form around rod 208. Said belts pass vertically into and out of tube 227 and are arranged so that the inner runs of said belts are close to the inner peripheral surface of said tube. Each of said belts is preferably formed of sheet material such as canvas or other closely woven and durable fabric and is disposed around a companion endless sprocket chain 236 (Fig. 2). Each of the endless conveyors 228 to 234 includes lower and upper sprocket wheels 238 and 240, respectively, suitably supported in vertically spaced relation for rotation, the lowest sprocket wheels 238 being fixed to companion driven shafts while the upper sprocket wheels 240 are supported for rotation but are not driven except through the companion sprocket chains 236, respectively. Referring to Fig. 5 and in conjunction with Fig. 2, it will be noted that sprocket gears 238 are operatively connected to each other for movement in unison. A driving shaft 242 is actuated by shaft 156 through gears 244 and 246 for rotating said sprocket gears 238. Shaft 242 is geared to the sprocket gears 238 of conveyors 228 and 234 between bevel gears 248, 250 and 252. Sprocket gear 238 of conveyor 230 is geared to sprocket gears 238 of conveyors 228 and 232 by the bevel gears 254, 256 and 258, 260, respectively. It will be understood that the flexible belts of the conveyors 228, 234 are disposed around rod 208 and are of such width that their adjacent edges are in abutting relation throughout the inner vertical runs of said flexible belts, except at the upper and lower ends of tube 227, so that the major portions of the inner vertical runs of the flexible belts define a generally cylindrical tube around rod 208. As the inner runs of these belts move downwardly, as indicated by the arrows in Fig. 2, they carry with them the dough-piece B4 for rounding the latter into its circular ring form. In this rounding operation, the portions of the dough-piece B4 which were pressed together by belts 28 and 30 as above described with particular reference to Figs. 7 and 9 are smoothed into the circular rounded body of the dough-piece. The completely formed dough-piece issues from the bottom of the rounding device 32, as indicated at B in Fig. 2 and as here shown said dough-piece drops onto a conveyor 262 for delivery to any suitable point, as will be readily understood.

It will be understood that after the rounded dough-pieces B are formed, they are cooked and baked in accordance with the usual method of making bagles.

Thus it is seen that the machine of the present invention is operable automatically to form bagle rings from a mass of bagle dough without requiring any handling of the dough or any manual operation thereon throughout the process of separation of the dough pieces from the mass of dough to the end of the ring-forming operation. It will be understood that various changes may be made without departing from the underlying idea of the invention within the scope of the appended claims.

Having thus described our invention, what we claim and desire to secure by Letters Patent is:

1. In a machine for forming rings of dough, means for shaping dough pieces in succession into substantially cylindrical form, a horizontal conveyor positioned to receive said dough pieces and movable in a direction transversely of the lengths of said cylindrical dough pieces and being narrower than the lengths of said pieces whereby the latter when deposited on said conveyor automatically bend into inverted U-shape, means comprising companion members movable at the same linear speed as said conveyor and positioned to receive therebetween the end portions of the U-shaped dough pieces, respectively, and press said end portions together to form endless dough pieces from said U-shaped pieces, respectively, means positioned to receive said endless dough pieces and round them into circular peripheral contour, said last mentioned means comprising a plurality of movable endless flexible belts disposed in a generally circular arrangement and collectively defining a conveyor having an inner cylindrical moving surface which engages said endless dough pieces and performs said rounding operation thereon, and means for moving said belts in unison in the same direction.

2. In a machine for forming rings of dough, the combination with means for shaping individual pieces of dough into endless pieces with an opening therethrough and with the dough around said opening of circular cross section, of means to round said endless dough pieces into circular peripheral contour comprising a plurality of movable endless flexible belts disposed in a generally circular arrangement and collectively defining a conveyor having an inner cylindrical moving surface which engages said endless dough pieces and performs said rounding operation thereon, and means for moving said belts in unison in the same direction, said last mentioned means including sprocket chains disposed within said belts, respectively, in engagement therewith, for moving said belts.

3. In a machine for forming rings of dough, means for rounding dough pieces which are endless and which have central openings therethrough, said means comprising a substantially cylindrical stationary rod around which the dough pieces are ringed for movement longitudinally thereof, a plurality of endless flexible belts disposed in a generally circular arrangement around said rod and spaced laterally thereof and collectively defining an inner cylindrical surface co-axial with said rod, said belts being mounted for movement for moving said cylindrical surface longitudinally of said rod, and means for moving said belts in unison at the same speed.

4. In a machine for forming rings of dough, means including a dough extruder and a cutter positioned in close proximity to the outlet of said extruder for forming individual dough pieces from a mass of dough, said cutter having a cutting edge at its lower end and being mounted for reciprocation substantially normal to the direction of feed of the dough through said outlet of the extruder, means for reciprocating said cutter, and means operatively connected to said cutter for moving the lower end of the latter in an arcuate path in the direction of said feed of the dough during the end of the dough cutting stroke of said cutter so as not to interfere with the feed of the dough, said means for moving the lower end of the cutter comprising means pivotally mounted about a fixed point on the machine and connected to the lower end of said cutter for causing the latter to move in a predetermined path toward and away from said outlet transversely of the path of said reciprocations of the cutter.

5. In a machine for forming rings of dough, means including a dough extruder and a cutter at the outlet of said extruder for forming individual dough pieces from a mass of dough, said cutter having a cutting edge at its lower end and being mounted for reciprocation substantially normal to the direction of feed of the dough through said outlet of the extruder, means for reciprocating said cutter, and means operatively connected to said cutter for moving the lower end of the latter in an arcuate path in the direction of said feed of the dough during the end of the dough cutting stroke of said cutter so as not to interfere with the feed of the dough, said means for reciprocating said cutter including a crank shaft the crank pin of which is operatively connected to said cutter at an upper portion thereof for said reciprocation thereof, and said means for moving the lower end of the cutter comprising means pivotally mounted about a fixed point on the machine and connected to the lower end of said cutter for causing the latter to move in a predetermined path toward and away from said outlet transversely of the path of said reciprocations of the cutter.

6. In a machine for forming rings of dough, means including a dough extruder and a cutter positioned in close proximity to the outlet of said extruder for forming individual dough pieces from a mass of dough, said cutter having a cutting edge at its lower end and a horizontal conveyor on which said dough pieces are deposited, said conveyor having a part thereof disposed immediately adjacent to said extruder outlet and in substantial vertical alignment therewith so that the dough pieces are severed by said cutter, as the dough issues through said outlet, immediately adjacent to said conveyor whereby said dough pieces are deposited on said conveyor substantially instantaneously after the severance of said pieces, respectively, from the dough at the extruder outlet, means for reciprocating said cutter, and means operatively connected to said cutter for moving the lower end of the latter in an arcuate path in the direction of said feed of the dough during the end of the dough cutting stroke of said cutter so as not to interfere with the feed of the dough, said means for reciprocating said cutter including a crank shaft the crank pin of which is operatively connected to said cutter for said reciprocation thereof, and said means for moving the lower end of the cutter comprising means pivotally mounted about a fixed point on the machine and connected to the lower end of said cutter for causing the latter to move in a predetermined arcuate path toward and away from said outlet transversely of the path of said reciprocations of the cutter.

7. In a machine for forming rings of dough from substantially cylindrical dough pieces, a horizontal conveyor movable in a direction transversely of the lengths of said cylindrical dough pieces and being narrower than the lengths of said pieces whereby the latter when deposited on said conveyor automatically bend into inverted U-shape, and means comprising companion members movable at the same linear speed as said conveyor and positioned to receive therebetween the end portions of the U-shaped dough pieces, respectively, and press said end portions together to form endless dough pieces from said U-shaped pieces, respectively.

8. In a machine for forming rings of dough from substantially cylindrical dough pieces, a horizontal conveyor positioned to receive thereon said dough pieces and movable in a direction transversely of the lengths of said cylindrical dough pieces and being narrower than the lengths of said pieces whereby the latter when deposited on said conveyor automatically bend into inverted U-shape, means comprising companion members movable at the same linear speed as said conveyor and positioned to receive therebetween the end portions of the U-shaped dough pieces, respectively, and press said end portions together to form endless dough pieces from said U-shaped pieces, respectively, a stationary cylindrical rod disposed at the delivery end of said conveyor and around which said endless dough pieces are ringed in succession, as they come off said conveyor, for movement longitudinally of said rod, a plurality of endless flexible belts disposed in a generally circular arrangement around said rod and spaced laterally thereof and collectively defining an inner movable cylindrical surface co-axial with said rod, said belts being mounted for movement for moving said cylindrical surface longitudinally of said rod, and means for moving said belts in unison at the same speed and in the same direction.

9. In a machine for forming rings of dough from substantially cylindrical dough pieces, a horizontal conveyor movable in a direction transversely of the lengths of said cylindrical dough pieces and being narrower than the lengths of said pieces whereby the latter when deposited on said conveyor automatically bend into inverted U-shape, and means comprising companion members movable at the same linear speed as said conveyor and positioned to receive therebetween the end portions of the U-shaped dough pieces, respectively, and press said end portions together to form endless dough pieces from said U-shaped pieces, respectively, said companion members comprising a pair of longitudinally movable members disposed in confronting relation in position to engage the free end portions of said pieces for pressing said end portions together.

10. In a machine for forming rings of dough from substantially cylindrical dough pieces, a horizontal conveyor movable in a direction transversely of the lengths of said cylindrical dough pieces and being narrower than the lengths of said pieces whereby the latter when deposited on said conveyor automatically bend into inverted U-shape, and means comprising companion members movable at the same linear speed as said conveyor and positioned to receive therebetween the end portions of the U-shaped dough pieces, respectively, and press said end portions together to form endless dough pieces from said U-shaped pieces, respectively, said horizontal conveyor comprising an endless belt on which said dough pieces are carried.

11. In a machine for forming rings of dough from substantially cylindrical dough pieces, a horizontal conveyor movable in a direction transversely of the lengths of said cylindrical dough pieces and being narrower than the lengths of said pieces whereby the latter when deposited on said conveyor automatically bend into inverted U-shape, and means comprising companion members movable at the same linear speed as said conveyor and positioned to receive therebetween the end portions of the U-shaped dough pieces, respectively, and press said end portions together to form endless dough pieces from said U-shaped pieces, respectively, said companion members comprising a pair of endless belts disposed vertically in confronting relation in position to engage the free end portions of said pieces for pressing said end portions together.

12. In a machine for forming rings of dough from substantially cylindrical dough pieces, a horizontal conveyor movable in a direction transversely of the lengths of said cylindrical dough pieces and being narrower than the lengths of said pieces whereby the latter when deposited on said conveyor automatically bend into inverted U-shape, means comprising companion members movable at the same linear speed as said conveyor and positioned to receive therebetween the end portions of the U-shaped dough pieces, respectively, and press said end portions together to form endless dough pieces from said U-shaped pieces, respectively, said companion members comprising a pair of endless belts disposed vertically in confronting relation in position to engage the free end portions of said pieces for pressing said end portions together, and means positioned adjacent said endless belts for supplying thereto a substance to prevent dough from adhering thereto.

13. In a machine for forming rings of dough from substantially cylindrical dough pieces, a horizontal conveyor movable in a direction transversely of the lengths of said cylindrical dough pieces and being narrower than the lengths of said pieces whereby the latter when deposited on said conveyor automatically bend into inverted U-shape, means comprising companion members movable at the same linear speed as said conveyor and positioned to receive therebetween the end portions of the U-shaped dough pieces, respectively, and press said end portions together to form endless dough pieces from said U-shaped pieces, respectively, said companion members comprising a pair of endless belts disposed vertically in confronting relation in position to engage the free end portions of said pieces for pressing said end portions together, and brushes positioned near and engageable with said belts for brushing the dough engaging surfaces thereof.

14. In a machine for forming rings of dough from substantially cylindrical dough pieces, a horizontal conveyor movable in a direction transversely of the lengths of said cylindrical dough pieces and being narrower than the lengths of said pieces whereby the latter when deposited on said conveyor automatically bend into inverted U-shape, means comprising companion members movable at the same linear speed as said conveyor and positioned to receive therebetween the end portions of the U-shaped dough pieces, respectively, and press said end portions together to form endless dough pieces from said U-shaped pieces, respectively, said companion members comprising a pair of endless belts disposed vertically in confronting relation in position to engage the free end portions of said pieces for pressing said end portions together, and means positioned adjacent said endless belts for supplying thereto a substance to prevent dough from adhering thereto, and brushes positioned near and engageable with said belts for brushing the dough engaging surfaces thereof.

15. A machine for forming rings of dough, comprising means for separating individual dough pieces in succession from a mass of dough, a longitudinally movable conveyor immediately adjacent said separating means on which said dough pieces are deposited in succession, a stationary shaping member disposed in vertically spaced relation with respect to said conveyor and positioned above said conveyor, the lower surface of said member having a raised intermediate surface portion, the latter and the adjacent surface of said conveyor coacting to shape said dough pieces in succession into substantially cylindrical dough formations, with the latter being thinner at their central portion, a second movable conveyor in tandem with said first mentioned conveyor and on which said substantially cylindrical dough pieces are deposited, said second conveyor being narrower than said first mentioned conveyor and narrower than the length of the dough pieces shaped by said first mentioned conveyor, whereby said shaped dough pieces automatically, by gravity, bend into inverted U-shape when deposited on said second conveyor with the bight portion being formed by said thinner portion, a plurality of endless belts movable in the same direction as said second conveyor and operably positioned to receive the end portions of the U-shaped dough pieces, respectively, therebetween and press said end portions together to form endless dough pieces from said U-shaped pieces, respectively, and means positioned adjacent said endless belts for supplying thereto a substance to prevent dough from adhering thereto.

16. In a machine for forming rings of dough, means for shaping individual dough pieces in succession into substantially cylindrical form with said dough pieces being thinner at an intermediate portion thereof, a horizontal conveyor positioned to receive said dough pieces and movable in a direction transversely of the lengths of said dough pieces, said conveyor being substantially narrower than the lengths of said pieces whereby the latter when depositioned on said conveyor bend, by gravity, into inverted U-shape, and means comprising companion members movable at the same linear speed as said conveyor and positioned to receive therebetween the end portions of the U-shaped dough pieces, respectively, and press said end portions together to form endless dough pieces from said U-shaped pieces, respectively.

17. In a machine for forming rings of dough, a member having a raised intermediate surface portion for shaping individual dough pieces in succession into substantially cylindrical form with said dough pieces being thinner at an intermediate portion thereof, a horizontal conveyor positioned to receive said dough pieces and movable in a direction transversely of the lengths of said dough pieces, said conveyor being substantially narrower than the lengths of said pieces whereby the latter when depositioned on said conveyor bend, by gravity, into inverted U-shape, and means comprising companion members movable at the same linear speed as said conveyor and positioned to receive therebetween the end portions of the U-shaped dough pieces, respectively, and press said end portions together to form endless dough pieces from said U-shaped pieces, respectively.

18. In a machine for forming rings of dough, a member having a convexly curved shaping surface for shaping individual dough pieces in succession into substantially cylindrical form with said dough pieces being thinner at an intermediate portion thereof, a horizontal conveyor positioned to receive said dough pieces and movable in a direction transversely of the lengths of said dough pieces, said conveyor being substantially narrower than the lengths of said pieces whereby the latter when depositioned on said conveyor bend, by gravity, into inverted U-shape, and means comprising companion members movable at the same linear speed as said conveyor and positioned to receive therebetween the end portions of the U-shaped dough pieces, respectively, and press said end portions together to form endless dough pieces from said U-shaped pieces, respectively.

19. In a machine for forming rings of dough, means for shaping individual dough pieces in succession into substantially cylindrical form with said dough pieces being thinner at an intermediate portion thereof, a horizontal conveyor positioned to receive said dough pieces and movable in a direction transversely of the lengths of said dough pieces, said conveyor being substantially narrower than the lengths of said pieces whereby the latter when depositioned on said conveyor bend, by gravity, into inverted U-shape, and means comprising companion members movable at the same linear speed as said conveyor and positioned to receive therebetween the end portions of the U-shaped dough pieces, respectively, and press said end portions together to form endless dough pieces from said U-shaped pieces, respectively, means positioned to receive said endless dough pieces and round them into circular peripheral contour, said last mentioned means comprising a plurality of movable endless flexible belts disposed in a generally circular arrangement and collectively defining a conveyor having an inner cylindrical moving surface which engages said endless dough pieces and performs said rounding operation thereon, and means for moving said belts in unison in the same direction.

20. In a machine for forming rings of dough, a member having a convexly curved shaping surface for shaping individual dough pieces in succession into substantially cylindrical form with said dough pieces being thinner at an intermediate portion thereof, a horizontal conveyor positioned to receive said dough pieces and movable in a direction transversely of the lengths of said dough pieces, said conveyor being substantially narrower than the lengths of said pieces whereby the latter when depositioned on said conveyor bend, by gravity, into inverted U-shape, and means comprising companion members movable at the same linear speed as said conveyor and positioned to receive therebetween the end portions of the U-shaped dough pieces, respectively, and press said end portions together to form endless dough pieces from said U-shaped pieces, respectively, means positioned to receive said endless dough pieces and round them into circular peripheral contour, said last mentioned means comprising a plurality of movable endless flexible belts disposed in a generally circular arrangement and collectively defining a conveyor having an inner cylindrical moving surface which engages said endless dough pieces and performs said rounding operation thereon, and means for moving said belts in unison in the same direction.

21. A machine for forming rings of dough, comprising means for separating individual dough pieces in succession from a mass of dough, a longitudinally movable conveyor immediately adjacent said separating means on which said dough pieces are deposited in succession, a stationary shaping member disposed in vertically spaced relation with respect to said conveyor and positioned above said conveyor, the lower surface of said member having a convexly curved shaping surface, the latter and the adjacent surface of said conveyor coacting to shape said dough pieces in succession into substantially cylindrical dough formations, with the latter being thinner at their central portion, a second movable conveyor in tandem with said first mentioned conveyor and disposed in relation therewith whereby to receive said dough pieces when the latter are discharged from said first conveyor, said second conveyor being narrower than said first mentioned conveyor and narrower than the length of the dough pieces shaped by said first mentioned conveyor, whereby said shaped dough pieces automatically, by gravity, bend into inverted U-shape when deposited on said second conveyor, a plurality of endless belts movable in the same direction as said second conveyor and operably positioned to receive the end portions of the U-shaped dough pieces, respectively, therebetween and press said end portions together to form endless dough pieces from said U-shaped pieces, respectively.

22. In a machine for forming rings of dough, a dough extruder having an outlet through which dough is extruded, a cutter mounted for reciprocation transversely of said outlet for intermittently engaging the dough at said outlet opening while the dough is passing therethrough for forming individual dough pieces, said cutter having a lower end adapted to be moved in the direction of said feed of the dough at the end of the dough cutting stroke of said cutter, means for reciprocating said cutter across said extruder outlet, and means operatively connected to said cutter for moving the lower end of the latter in the direction of said feed of the dough at the end of the dough cutting stroke of said cutter so as not to interfere with the feed of the dough through said outlet, said means for moving the lower end of the cutter comprising means mounted for pivotal movement about a stationary pivot and connected to the lower end of said cutter for oscillating the latter in a fixed arcuate path toward and away from said outlet transversely of the path of said reciprocation of the cutter.

23. In a machine for forming rings of dough, a dough extruder having an outlet through which dough is extruded, a cutter mounted for reciprocation transversely of said outlet for intermittently engaging the dough at said outlet opening while the dough is passing therethrough for forming individual dough pieces, said cutter having a lower end adapted to be moved in the direction of said feed of the dough at the end of the dough cutting stroke of said cutter, means for reciprocating said cutter across said extruder outlet, and means operatively connected to said cutter for moving the lower end of the latter in the direction of said feed of the dough at the end of the dough cutting stroke of said cutter so as not to interfere with the feed of the dough through said outlet, said means for reciprocating said cutter including a crank shaft the crank pin of which is operatively connected to an upper part of said cutter for said reciprocation thereof, and said means for moving the lower end of the cutter comprising means pivotally mounted about a fixed point on the machine and connected to a lower part of said cutter for causing the latter to move in a predetermined path toward and away from said outlet transversely of the path of said reciprocation of the cutter.

24. In a machine for forming rings of dough, a dough extruder having an outlet through which dough is extruded, a cutter mounted for reciprocation transversely of said outlet for intermittently engaging the dough at said outlet opening while the dough is passing therethrough for forming individual dough pieces, said cutter having a lower end adapted to be moved in the direction of said feed of the dough at the end of the dough cutting stroke of said cutter, a horizontal conveyor movable in the direction of the feed of said dough on which said dough pieces are depositioned, said conveyor having a part thereof disposed immediately adjacent to said extruder outlet and in substantial vertical alignment therewith so that the dough pieces are severed by said cutter, as the dough issues through said outlet, immediately adjacent to said conveyor whereby said dough pieces are deposited on said conveyor substantially instantaneously after the severance of said pieces, respectively, from the dough at the extruder outlet, means for reciprocating said cutter, and means operatively connected to said cutter for moving the lower end of the latter in an arcuate path in the direction of said feed of the dough during the end of the dough cutting stroke of said cutter so as not to interfere with the feed of the dough, said means for reciprocating said cutter including a crank shaft having a crank pin of which is operatively connected to said cutter for said reciprocation thereof, and said means for moving the lower end of the cutter comprising means pivotally mounted about a fixed point on the machine and connected to the lower end of said cutter for causing the latter to move in a predetermined arcuate path toward and away from said outlet transversely of the path of said reciprocation of the cutter.

25. In a machine for forming rings of dough, a dough extruder having an outlet through which dough is extruded, a cutter mounted for reciprocation transversely of said outlet for intermittently engaging the dough at said outlet opening while the dough is passing therethrough for forming individual dough pieces, said cutter having a lower end adapted to be moved in the direction of said feed of the dough at the end of the dough cutting stroke of said cutter, means for reciprocating said cutter across said extruder outlet, and means operatively connected to said cutter for moving the lower end of the latter in the direction of said feed of the dough at the end of the dough cutting stroke of said cutter so as not to interfere with the feed of the dough through said outlet, said means for moving the lower end of the cutter comprising linkage means mounted for pivotal movement on a stationary pivot and pivotally connected to the lower end of said cutter for oscillating the latter in a fixed arcuate path toward and away from said outlet transversely of the path of said reciprocation of the cutter.

26. In a machine for forming rings of dough, a dough extruder having an outlet through which dough is extruded, a cutter mounted for reciprocation transversely of said outlet for intermittently engaging the dough at said outlet opening while the dough is passing therethrough for forming individual dough pieces, said cutter having a lower end adapted to be moved in the direction of said feed of the dough at the end of the dough cutting stroke of said cutter, means for reciprocating said cutter across said extruder outlet, and means operatively connected to said cutter for moving the lower end of the latter in the direction of said feed of the dough at the end of the dough cutting stroke of said cutter so as not to interfere with the feed of the dough through said outlet, said means for moving the lower end of the cutter comprising a longitudinally extending link having one end portion thereof mounted for pivotal movement on a stationary pivot and having an opposite end portion thereof pivotally connected to the lower end of said cutter for oscillating the latter in a fixed arcuate path toward and away from said outlet transversely of the path of said reciprocation of the cutter.

27. In a machine for forming rings of dough, a dough extruder having an outlet through which dough is extruded, a cutter mounted for reciprocation transversely of said outlet for intermittently engaging the dough at said outlet opening while the dough is passing therethrough for forming individual dough pieces, said cutter having a lower end adapted to be moved in the direction of said feed of the dough at the end of the dough cutting stroke of said cutter, means for reciprocating said cutter across said extruder outlet, and means operatively connected to said cutter for moving the lower end of the latter in the direction of said feed of the dough at the end of the dough cutting stroke of said cutter so as not to interfere with the feed of the dough through said outlet, said means for moving the lower end of the cutter comprising a longitudinally extending adjustable link having one end portion thereof mounted for pivotal movement on a stationary pivot and having an opposite end portion thereof pivotally connected to the lower end of said cutter for oscillating the latter in a fixed arcuate path toward and away from said outlet transversely of the path of said reciprocation of the cutter, and means for adjusting the longitudinal extent of said link whereby to vary said predetermined path.

28. In a machine for forming rings of dough, a dough extruder having an outlet through which dough is extruded, a cutter mounted for vertical reciprocation at said outlet for intermittently engaging the dough at said outlet opening while the dough is passing therethrough for forming individual dough pieces, said cutter having a lower end adapted to be moved in the direction of said feed of the dough at the end of the dough cutting stroke of said cutter, a horizontal conveyor movable in the direction of the feed of said dough on which said dough pieces are deposited, said conveyor having a part thereof disposed immediately adjacent to said extruder outlet and in substantial vertical alignment therewith so that the dough pieces are severed by said cutter, as the dough issues through said outlet, immediately adjacent to said conveyor whereby said dough pieces are deposited on said conveyor substantially instantaneously after the severance of said pieces, respectively, from the dough at the extruder outlet, means for reciprocating said cutter, and means operatively connected to said cutter for moving the lower end of the latter in an arcuate path in the direction of said feed of the dough during the end of the dough cutting stroke of said cutter so as not to interfere with the feed of the dough, said means for reciprocating said cutter including a crank shaft having a crank pin of which is operatively connected to said cutter for said reciprocation thereof, and said means for moving the lower end of the cutter comprising a longitudinally extending adjustable link having one end portion thereof mounted for pivotal movement on a stationary pivot and having an opposite end portion thereof pivotally connected to the lower end of said cutter for oscillating the latter in a fixed arcuate path toward and away from said outlet transversely of the path of said reciprocation of the cutter, and means for adjusting the longitudinal extent of said link whereby to vary said predetermined path.

LOUIS GENDLER.
MORRIS LAZAR.

References Cited in the file of this patent

UNITED STATES PATENTS

| Number | Name | Date |
|---|---|---|
| 754,549 | Dietz | Mar. 15, 1904 |
| 813,375 | Glauser | Feb. 20, 1906 |
| 902,088 | Kintner | Oct. 27, 1908 |
| 1,028,820 | Hanna | June 4, 1912 |
| 1,397,233 | Robbins | Nov. 15, 1921 |
| 1,552,430 | Gondler | Sept. 8, 1925 |
| 1,739,892 | Elliott | Dec. 17, 1929 |
| 1,755,921 | Gendler | Apr. 22, 1930 |
| 1,900,607 | Kremmling | Mar. 7, 1933 |
| 2,026,526 | Gipe | Jan. 7, 1936 |
| 2,043,684 | Walter | June 9, 1936 |
| 2,068,220 | Baechi | Jan. 19, 1937 |
| 2,107,749 | Curtis | Feb. 8, 1938 |
| 2,136,487 | Brykczynski et al. | Nov. 15, 1938 |
| 2,295,246 | Weida | Sept. 8, 1942 |
| 2,505,243 | Hewitt et al. | Apr. 25, 1950 |